March 21, 1961  J. C. WEBBER  2,975,722
SWAB
Filed Feb. 25, 1957
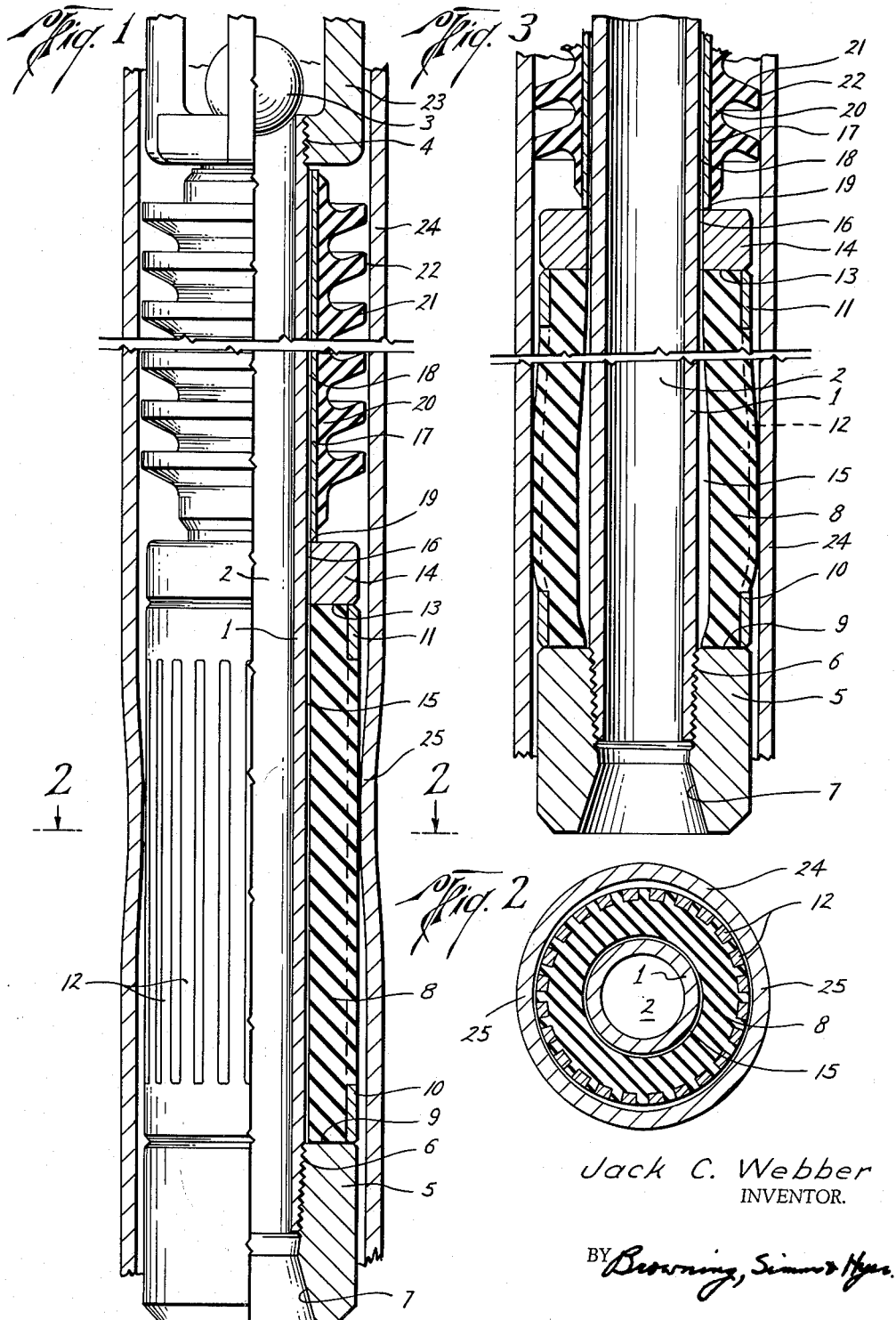
Jack C. Webber
INVENTOR.
ATTORNEYS

United States Patent Office 2,975,722
Patented Mar. 21, 1961

2,975,722
SWAB
Jack C. Webber, 353 Dolphin Place, Corpus Christi, Tex.
Filed Feb. 25, 1957, Ser. No. 642,120
2 Claims. (Cl. 103—225)

This invention relates to a swab for moving a fluid substance through a passageway. It is especially adapted to swabbing a liquid from a pipe such as a tubing or casing in a well.

Swabs for this purpose generally are well known. Swabs comprising a hollow body or mandrel having a cup or sleeve type sealing element thereon to form a seal against the wall of the passageway have been so employed. Exampels of such swabs are disclosed in the patent to Thaheld 2,144,977, issued January 24, 1939. However, such a swab element must be made with an outer diameter close enough to the inner diameter of the passageway that when it is moved through the passageway in a direction to move fluid therein, there will be a pressure drop along the outer surface sufficient to cause the pressure within the element to expand it into sealing engagement with the passageway wall. Swabs of this nature must also be very stiff to carry the tremendous loads that are sometimes placed upon them, because they are what may be termed positive swabs or swabs that will not unload no matter how much load may be placed on them. To this end they are customarily reinforced with spring wire or cage structures. Such swabs frequently encounter difficulty in passing obstructions in a pipe such as slightly flattened areas and paraffin and other deposits. They must be too large to pass such obstructions without yielding and they must be made too stiff to yield readily.

In my previous patent No. 2,633,808, issued April 7, 1953 I have disclosed a swab which overcomes the above described difficulties by employing sealing lips which engage the wall of the passageway, which lips are flexible enough to yield and pass readily obstructions ordinarily encountered. This swab is so designed that it will also yield under excessive loads and unload excessive loads, retaining and lifting only the load for which it was designed. It has proven highly successful in widespread commercial use. However, there are situations in which it is desirable to employ swabs which will be positive in action in that they will lift any load to which they are subjected, without unloading, but will still readily pass obstructions in the pipe or other passageway in which they may be operated.

It is an object of this invention to provide a swab which will be positive in its action, yet capable of readily passing obstructions likely to be encountered.

Another object is to provide a positive swab with a stiff sealing element of a diameter small enough to pass obstructions likely to be encountered, yet which will be expanded by fluid pressure when moved against a liquid or the like.

Another object is to provide a positive swab with a stiff sealing element of a diameter small enough to pass obstructions likely to be encountered, with a means for expanding it independently of the pressure drop along its outer face, and which means for expanding will itself readily pass such obstructions.

Another object is to provide a swab by which either light or heavy loads may be lifted from any depth.

Another object is to provide a swab in which there will be no expansible sealing members of such a nature that they will be likely to become filled with sand or other matter that will interfere with collapse of the swab elements to something less than the inside diameter of the passageway through which the swab may be operated.

Another object is to provide a swab which will tend to bypass rather than to collect foreign matter in the course of its swabbing stroke.

Another object is to provide a positive type swab in which unusually heavy reinforcing may be employed to provide the swab with much longer wearing life.

Another object is to provide a swab member which may be reversed to approximately double its life.

Other objects and advantages will become apparent from the following description taken in connection with the accompanying drawings in which is disclosed one embodiment of the invention, it being understood that the same is by way of illustration and example only, and not by way of limitation, this invention being limited only by the prior art and by the terms of the appended claims.

In the drawings:

Fig. 1 is a view, partly in longitudinal cross section and partly in elevation, showing a swab construction in accordance with this invention in place in a passageway through a pipe at the time of passing down through an obstruction in such pipe.

Fig. 2 is a transverse cross section taken along the line 2—2 of Fig. 1.

Fig. 3 is a view similar to the lower part of Fig. 1 showing the lower portion of the swab illustrated in Figs. 1 and 2 but with the parts in the position they occupy when forcing a full load of liquid or the like through the pipe.

In general the objects of this invention are achieved by the employment of a positive type of swab element expansible by pressure but of such a small diameter that it will readily pass obstructions in the passageway in which it is to be employed, so that under ordinary circumstances pressure drop due to flow past the element will be insufficient to create a pressure differential between the interior and exterior element that it will expand it, and then combining with such element a means which will create a differential in pressure between the interior and exterior of the element sufficient to expand it into sealing position, yet which will itself readily pass obstructions.

On reference to the drawing it will be seen that the embodiment therein illustrtaed employs a hollow mandrel 1 having a flow passageway 2 therethrough which is adapted to be closed at its upper end by means of a ball type check valve 3. This mandrel is threaded at its upper end 4 for a purpose presently to be explained. At its lower end the collar 5 is threadedly engaged with the mandrel 1 as shown at 6. This collar 5 has an opening 7 therethrough registering with the flow passageway 2 through the mandrel.

The mandrel arrangement thus described is similar to those conventionally employed with other types of swabs.

However, in accordance with this invention there is provided a positive swabbing element in the form of an elongated sleeve 8 of rubber or other suitable flexible packing material. In this instance the sleeve 8 is made longer than in the case of the usual sleeve type swab element for a purpose which will presently be explained. Its lower end 9 is adapted to rest upon the upper surface of the collar 5 and when this swab element is loaded by fluid under pressure from above the swab it will form a suitable seal with the collar 5 at this point.

The sleeve 8 is preferably reinforced by a metal reinforcing arrangement which may be of any suitable conventional form but which is preferably of the novel form illustrated in the drawing, namely a cage comprising a lower band or collar 10 surrounding the lower end portion of the sleeve 8, a similar collar or band 11 surrounding the upper end portion of this sleeve, and intermediate bars 12 extending longitudinally between and interconnecting the bands 10 and 11. As illustrated, this reinforcing cage is located substantially at the outer surface of the sleeve element 8 but it will be understood that it can be otherwise located if found more desirable either from the standpoint of utility or from the standpoint of ease of manufacture. The location shown is preferable from the standpoint of wear resistance.

Engaging the upper end 13 of the sleeve 8 is a ring 14 adapted when pushed down against the sleeve 8 to provide a substantial seal thereagainst. It is to be noted that both the sleeve 8 and the ring 14 fit rather loosely around the mandrel 1 so as to leave an annular space 15 within the sleeve 8 and an annular space 16 within the ring 14. It will be understood that this annular space has a very small dimension in a radial direction but that it is sufficient to enable fluid under pressure from above to enter and exert a fluid pressure on the interior of the sleeve 8 tending to expand it.

Superimposed upon the ring 14 is a second swabbing element comprising a metal tube or sleeve 17 surrounding the mandrel 1 and likewise slightly spaced therefrom as shown at 18 to permit the passage of fluid under pressure downwardly therethrough and into the interior of the sleeve 8. This tube 17 bears at 19 against the ring 14 and provides what is for the purposes of this invention a closure or seal against the ring 14. It will be understood that a slight flow may take place between these elements without destroying the functioning of the parts in the manner hereinafter described, but that these parts should be formed so as to prevent more than a very small leakage of fluid between them.

Surrounding the tube 17 and preferably vulcanized or otherwise joined thereto is a sealing element 20 formed of rubber or other suitable material having outwardly and upwardly extending lips 21, vertically spaced from each other along the length of this element. Each of the lips 21 terminates in an outer edge 22 which is of such a diameter that it will be located close to if not actually in engagement with the inner surface of the passageway through the tubing. This sealing element 20 is made with its lips quite flexible as compared with the sleeve 8 so that even though the edges 22 of the lips 21 normally lie close to if not in engagement with the tubing, they may nevertheless yield readily so as to pass through obstructions likely to be encountered.

The swab elements are retained against excessive upward movement on the mandrel 1 by means of the valve cage 23 engaged with the threads 4. This valve cage 23 serves to retain the ball check valve 3 and is normally provided on its upper end with a means for connecting it to a wire or cable by which the swab is suspended and moved upwardly in operation.

The pipe in which the swab just described is intended to be operated is illustrated in cross section at 24 and at the points 25 there is illustrated one form of obstruction which may be encountered in such pipe, namely a flattened portion which may have been caused by means such as accidental handling of the pipe before its insertion in the well.

It will be seen that the sleeve type element 8 is made sufficiently small in diameter so that it will readily pass such an obstruction as shown at 25. Likewise, it will pass other obstructions that may be encountered, such as paraffin deposits in well tubing and the like. Due to this small diameter, however, it cannot ordinarily be expanded in the absence of the upper element 20 by merely pulling it upwardly through liquid in the pipe because the liquid would flow past the outside of the sleeve 8 without causing a sufficient pressure drop along the outside surface to enable the pressure within the sleeve to expand the stiff sleeve.

In order to provide for the expansion of this stiff positive swab element of small diameter the upper swabbing element is provided. This upper swabbing element is essentially of such a nature that it will permit the well fluids to pass downwardly through it and into the interior of the sleeve 8 so as to provide an expanding pressure for the sleeve, but of such a type that it will cause a reduction in pressure against the outside of the sleeve as compared with that inside the sleeve.

The element illustrated is of a type which may be termed an unloading type swab element. That is, it will unload part of the load placed upon it under certain conditions but will retain enough load so that it will, at least initially, keep enough pressure from the outside face of the sleeve 8 to permit it to be expanded into sealing engagement with the pipe by the pressure within the sleeve.

In the present instance this is accomplished by a type of swab element which is designed to lift a given predetermined load and no more. Thus it can be designed to create any prescribed or desired pressure differential between the interior and exterior of the sleeve 8 to expand it upon upward movement of the assembly within the passageway of the pipe 24. This element, as explained in my earlier patent, No. 2,633,808, is of such a nature that the lips 21 under a predetermined load will turn down to the position illustrated in Fig. 3 and permit enough of the load above them to slip past their edges so that such load will be reduced to a value which the stiffness of the lips 21 will permit them to sustain. This will create the desired differential between the interior and exterior of the sleeve 8.

It will be appreciated that once the sleeve 8 has been expanded into sealing engagement with the pipe 24, as illustrated in Fig. 3, the differential created by the upper sealing element 20 will no longer be essential because the pressure will have been removed substantially entirely from that portion of the exterior of the sleeve which has been forced into sealing engagement with the tubing. Therefore, the most essential characteristic of the upper sealing element is that it initially reduces the pressure on the exterior of the sleeve 8 as compared with the interior thereof sufficiently to cause the sleeve 8 to expand into sealing engagement with the wall of the passageway. It is desirable that it thereafter permit at least a part of the load to pass by the upper element and be carried by the lower or positive acting sleeve element.

For purposes of this description and the appended claims the term "pressure expansible swab element" has been used to designate a swab element normally of an outer dimension insufficient to seal against the wall of the passageway to be swabbed and having its interior open to the pressure of the fluid being swabbed so that such fluid will tend to expand the element into sealing engagement with the wall of the passageway. A swab element is termed a "positive" swab element when it is of a nature not intended to yield under load to release all or part of its load but is intended to have a positive action as a swab element. The term "sleeve type" swab element is intended to refer to an element of the type illustrated in the drawing by the numeral 8 in that its two ends are of similar size and characteristics and primarily its expansion is intended to take place along an intermediate portion of its length.

Likewise, the term "expander means" is intended to cover any means operable to cause expansion of the pressure expansible swab element so long as it is located and has the other characteristics described in the respective claims. The term "limited-load" as applied to a sealing means or element is intended to apply to such an element which is designed to carry a predetermined maximum load and to permit loads in excess of such maximum to bypass. The term "unloading type" element is intended to include all types which will under load release at least a part of the load applied thereto but is not intended to be limited to the amount of load which will be released.

It will be apparent that by this invention there has been provided a swab which may be employed to move either light or heavy loads through a passageway and in the case of swabbing a pipe in a well, to lift such load from any depth.

It is also apparent that sticking of the swab in tight places in the passageway or wherever obstructions occur or failure of the swab to move down through a pipe in the well, or the like, will be very unlikely to occur because of the small outer diameter with which the positive acting portion of the swab may be formed, and because of the degree of flexibility that can be built into the unloading type portion of the swab. In this connection it will be noted that the flanges 21 of this portion of the swab may be made extremely flexible yet lift any predetermined amount of load before unloading by the simple expedient of increasing the number of such flanges employed.

The sleeve type swab element illustrated in the drawing is preferred over other more conventional positive acting swab elements because it offers less opportunity for sand or other foreign matter to get inside of the element when it is expanded and prevent it from being collapsed if and when desired. Such foreign matter, with the sleeve type element is much more likely to be bypassed in the action of the swabbing. Also the sleeve type element is susceptible of being made reversible as illustrated and, in use, the lower outer portion of the sleeve type element takes most of the wear. Therefore, when one end portion has taken a substantial amount of wear this element may be reversed to substantially increase its useful life. The sleeve may be longer than conventional so the wear zones will not overlap.

The combination of elements forming this invention makes possible a positive acting element with a heavier reinforcement and hence with longer life because of the provision for creating substantially any predetermined differential of pressures between the interior and exterior of this element to cause its expansion.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A swab for moving fluid through a passageway in one direction comprising a mandrel having a flowway, a check valve interposed in said flowway permitting flow through the flowway in said one direction only, a pressure expansible swab element on and surrounding said mandrel and having an unexpanded diameter substantially smaller than the interior of the passageway it is adapted to swab to enable it to pass obstructions normally present in such passageway, the interior of said element adjacent said mandrel being in communication with the space above the swab in such passageway, and a limited-load sealing means engaging an upper portion of said expansible element and having a part of an outer dimension substantially as great as the inner dimension of such passageway and flexible to permit it to readily pass obstructions therein and to bypass fluid load thereon in excess of a predetermined maximum.

2. A swab for moving fluid through a passageway in one direction comprising a mandrel having a flowway, a check valve interposed in said flowway permitting flow through the flowway in one direction only, a positive pressure expansible swab element on and surrounding said mandrel and having an unexpanded diameter substantially smaller than the interior of the passageway it is adapted to swab to enable it to pass obstructions normally present in such passageway, the interior of said element adjacent said mandrel being in communication with the space above the swab in such passageway, and a sealing member on said mandrel in said one direction from said element having parts of a diameter when undistorted substantially as great as such passageway and yieldable to readily pass obstructions normally present in such passageway and operable upon upward movement through a fluid in such passageway in said one direction to sustain part of the pressure load and prevent it from acting on the exterior only of said element and thereby create a pressure differential between the interior and exterior of said element and cause it to expand from its unexpanded state into contact with the wall of such passageway, said sealing member also having parts yieldable under predetermined pressure load to limit the differential pressure which said member can create.

References Cited in the file of this patent

UNITED STATES PATENTS

| | | |
|---|---|---|
| 214,919 | Jenks | Apr. 29, 1879 |
| 1,495,807 | Sanders | May 27, 1924 |
| 1,669,812 | Crickmer | May 15, 1928 |
| 1,743,937 | Standlee | Jan. 14, 1930 |
| 2,633,808 | Webber | Apr. 7, 1953 |
| 2,674,201 | Talbott | Apr. 6, 1954 |
| 2,719,768 | Webber | Oct. 4, 1955 |